United States Patent [19]

Zeidler

[11] 3,997,035

[45] Dec. 14, 1976

[54] AUTOMATIC SLACK ADJUSTER FOR VEHICLE BRAKES

[75] Inventor: Reinhold Carl Zeidler, Birmingham, Mich.

[73] Assignee: Borg-Warner Corporation, Chicago, Ill.

[22] Filed: Sept. 2, 1975

[21] Appl. No.: 609,769

[52] U.S. Cl. .................... 188/79.5 K; 188/196 BA
[51] Int. Cl.² ......................................... F16D 65/56
[58] Field of Search ............... 188/79.5 K, 196 BA

[56] References Cited
UNITED STATES PATENTS

| | | | |
|---|---|---|---|
| 2,920,724 | 1/1960 | Margetic et al. | 188/79.5 K X |
| 3,351,163 | 11/1967 | Sander et al. | 188/79.5 K X |
| 3,901,357 | 8/1975 | Reitz et al. | 188/79.5 K |

Primary Examiner—Duane A. Reger
Attorney, Agent, or Firm—James A. Geppert

[57] ABSTRACT

A slack adjuster for a cam-actuated vehicle brake that automatically compensates for lining wear of the brake, wherein the adjuster is capable of differentiating between that portion of the actuating piston stroke required to take up the running clearance between the brake shoes and brake drum from the non-braking to the braking position and that portion of the piston stroke occurring because of the lining wear of the brake shoes. The slack adjuster utilizes a lever rotated by an actuating piston and housing a worm gear on a cam shaft for the brake actuating cam, a worm shaft having a worm engaging the worm gear, an actuator or driving member positioned on and rotatable relative to the worm shaft, a one-way spring clutch encompassing the actuator and worm shaft, a friction device to prevent unintentional turning of the worm shaft, and a linkage between the actuating piston and the actuator to rotate the actuator and the worm through the one-way clutch, thereby adjusting the brake during the braking or brake releasing stroke only where there is a greater braking stroke than that required to close the running clearance between the brake shoes and the brake drum.

25 Claims, 6 Drawing Figures

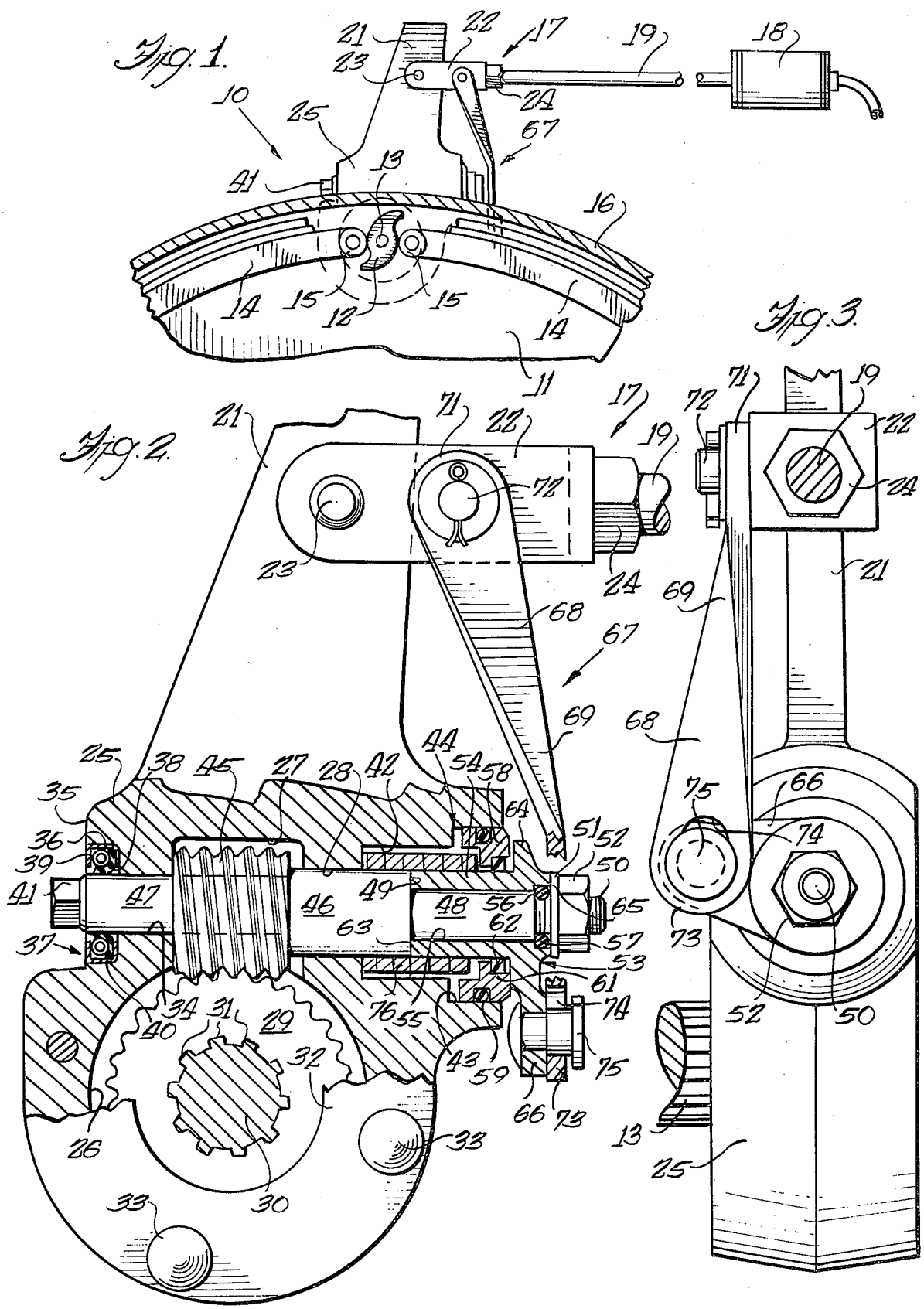

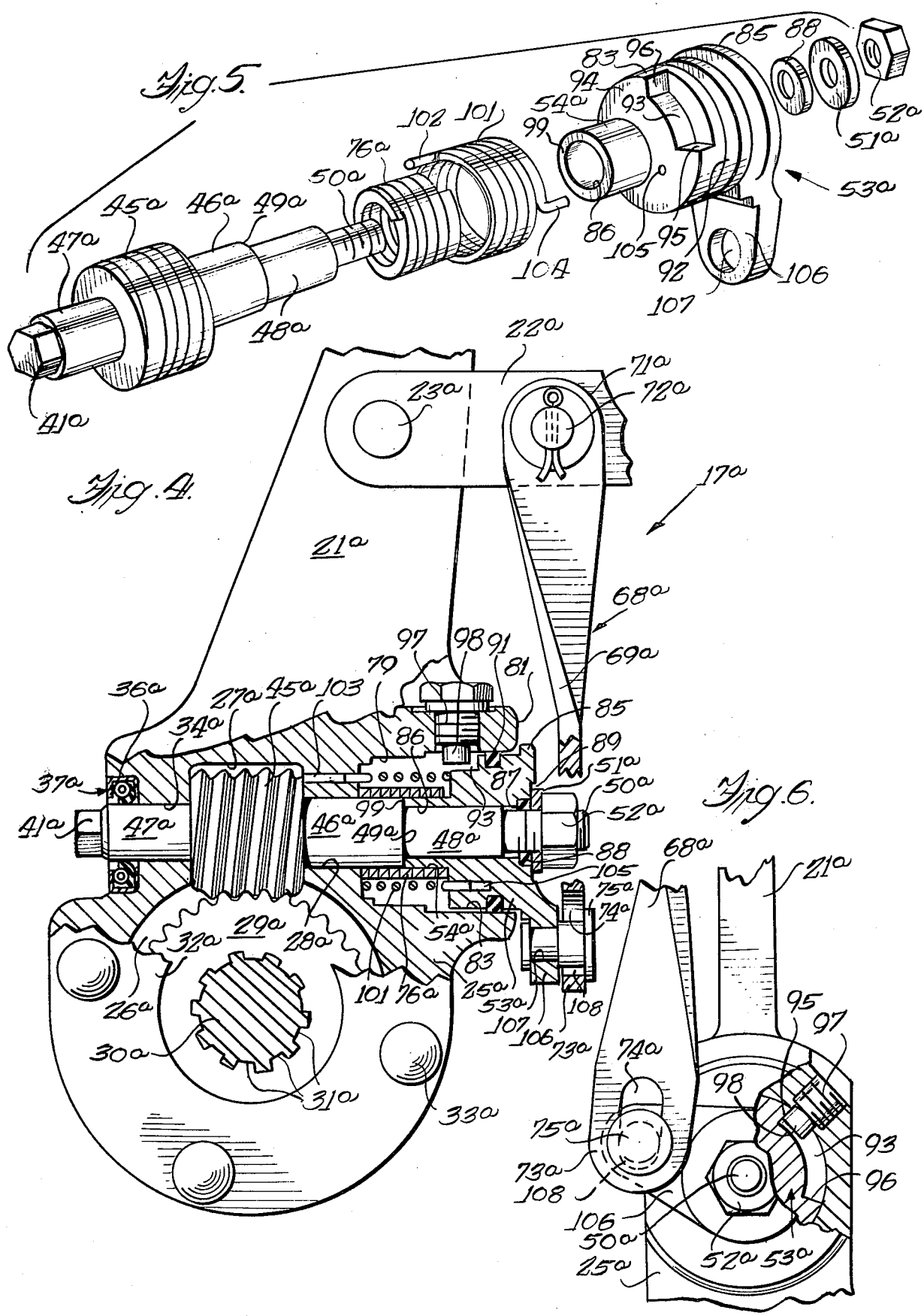

AUTOMATIC SLACK ADJUSTER FOR VEHICLE BRAKES

BACKGROUND AND SUMMARY OF THE INVENTION

The present invention relates to an automatic slack adjuster for cam-actuated brakes of a motor vehicle, and more particularly to a mechanism for automatically taking up the slack which develops between the movable elements of a vehicle brake and the member which transmits the operating force thereto as the brake lining and the mechanical parts cooperating therewith undergo normal wear.

Known types of slack adjusters for cam-actuated brakes of vehicles, especially of the heavy-duty variety, generally have utilized a manual setting arrangement for each adjuster, making it necessary to check and readjust each brake shoe slack adjuster periodically. To do this, brakes are manually snugged up to create a heavy drag and then loosened for a half or more turns of an adjusting screw. The adjustment is then set where the mechanic thinks he has a free wheel, thereby providing a fairly short brake chamber and push rod travel. As the brakes are repeatedly applied, lining wear occurs, thus gradually increasing push rod travel to the point where readjustment is required. The vehicle must, therefore, be returned to the shop for manual adjustment of the brakes at short intervals. One major disadvantage of manual brake adjustment is the likelihood, on the part of the mechanic, of making adjustments on the tight side rather than on the loose side to avoid the usual kickback in a short time that the brakes are still too loose. Obviously, the tight adjustment increases the wear on the linings, provides excessive drag and heat, and creates a much shorter brake life.

To overcome the disadvantages of manually set slack adjusters, more recent slack adjusters have the feature of taking up the wear on each individual wheel by automatic means. However, such presently known adjusters for cam-actuated brake systems are subject to certain limitations. Most known adjusters provide an adjustment of the cam shaft and cam in response to the total angular rotation of the cam and shaft. A portion of this cam rotation is utilized to move the brake shoes from the non-braking position to a braking position where the brake shoes contact the drum; and a further portion of cam rotation occurs after initial contact and results from distortion or deformation of the brake drum, brake lining, brake shoes, cam shaft and air chamber bracket.

Most previously known automatic adjusters have been unable to distinguish between the brake shoe movement over the normal running clearance to initial braking contact with the drum and addition rotation of the cam due to the distortion or deformation above described. Also, because of such deformation, prior known adjusters will provide adjustment as a consequence of a single very hard application of the brakes, although no adjustment is really required; so that as a result, the slack for running clearance will become too small. The danger of such false adjustment is particularly great where a hand brake is connected to a power operated brake system. The present invention overcomes these above recited limitations to provide an improved automatic slack adjuster system.

Among the objects of the present invention is the provision of a novel automatic slack adjuster for vehicle brakes which compensates for brake lining wear and utilizes a torque limiting one-way spring clutch acting to adjust the slack for a cam-actuated brake during brake application. A linkage mechanism between an actuating rod of a braking power source and the shaft for a worm gear of the adjustment assembly is directly connected to a driving member of the torque limiting clutch for the worm shaft, and a friction member prevents unintentional worm shaft rotation when the brake shoes are not engaged with the drum.

Another object of the present invention is the provision of a novel automatic slack adjuster for vehicle brakes wherein the combination of an actuator, one-way spring clutch and a torsion spring together with an adjustable worm and worm gear combination is sealed within the operating arm member. The worm shaft, actuator, one-way spring clutch and torsion spring are all mounted in the member in concentric relationship. During brake application, assuming some lining wear has occurred, the worm and worm gear are under load after about one-half the full stroke has occurred; at which point rotation of the actuator occurs while the brake shoes have moved to firmly engage the drum. As the worm is under load and cannot rotate, the one-way spring clutch overrides the worm shaft. Upon release of the brake, the torsion spring tends to rotate the actuator in the opposite direction, but cannot because the one-way clutch is now drivingly connected to the worm shaft which is still under load. As the brake shoes disengage from the drum, the load on the worm gear and the worm shaft is reduced to a point where the torsion spring can now return the actuator, thereby advancing the worm on the gear and moving the operating arm in a slack reducing direction. A friction member prevents unintentional rotation of the worm shaft when the shaft is not otherwise loaded.

A further object of the present invention is the provision of a novel automatic slack adjuster for brakes wherein a limit stop is provided in the operating arm member cooperating with the actuator to hold the actuator and torsion spring in a preloaded condition. Upon brake release, the cocked torsion spring cooperates with the actuator and one-way clutch to drive the worm and advance the arm to a new adjusted position.

The present invention also comprehends the provision of a novel automatic slack adjuster for vehicle brakes utilizing a direct linkage between the brake actuating power source and the rotary actuator in the operating arm assembly; wherein the lower end of the link has an elongated slot formed therein receiving suitable means such as a pivot pin mounted in an arm of the actuator. The elongated slot provides a lost motion operation equal to the desired normal running clearance between the linings and the drum. Thus, the slack portion of an actuating stroke wherein the brake shoes are moved from a retracted position to a drum engaging position does not provide any rotation of the actuator or adjustment of the worm gear until there is a measurable amount of wear of the brake shoe linings.

Further objects are to provide a construction of maximum simplicity, efficiency, economy, and ease of assembly and operation, and such further objects, advantages, and capabilities as will later more fully appear and are inherently possessed thereby.

DESCRIPTION OF THE DRAWINGS

FIG. 1 is a side elevational view of a cam-actuated brake system with the slack adjuster mechanism of the present invention applied thereto.

FIG. 2 is an enlarged side elevational view, partially in cross section, of one embodiment of an operating arm member having the slack adjusting mechanism therein.

FIG. 3 is an end elevational view of the operating arm assembly taken from the right-hand side of FIG. 2.

FIG. 4 is an enlarged side elevational view, partially in cross section, of a second embodiment of the operating arm assembly.

FIG. 5 is an enlarged exploded perspective view of the worm gear and slack adjusting mechanism within the operating arm of FIG. 4.

FIG. 6 is a partial end elevational view, partly in cross section, of the operating arm assembly of FIG. 4.

DESCRIPTION OF THE PREFERRED EMBODIMENTS

Referring more particularly to the disclosure in the drawings wherein are shown illustrative embodiments of the present invention, FIG. 1 discloses a brake assembly 10 comprising a brake support member 11 which is adapted to receive and rotatably support a brake shoe actuating means in the form of an S-shaped cam 12 non-rotatably secured to a cam shaft 13, which is supported for rotation in the brake support member 11 by suitable bearing means (not shown). A pair of outwardly expanding brake shoes 14 have followers 15 engaging the opposite cam surfaces of the cam 12 in such a manner that upon rotation of the cam, the brake shoes 14 are moved generally radially outwardly into engagement with a cooperating rotatable brake drum 16. Secured to the opposite end of the cam shaft 13 is an operating arm assembly 17 adapted to be driven through an angular displacement by means of an appropriate power source, such as an air motor 18.

A force transmitting member or piston rod 19 is reciprocated by the air motor 18 and is connected to an upwardly extending lever arm 21 of the assembly 17 by a clevis 22 and pivot pin 23. The outer end of the rod 19 is threadingly engaged to the base portion of the clevis, and a lock nut 24 retains the rod in its adjusted position relative to the clevis 22. The assembly 17 also includes a body portion 25, integral with the lever arm 21, having a worm gear cavity 26 therethrough and joined at one side to a worm recess 27 which, in turn, is intercepted by worm shaft bore 28. The worm gear cavity 26 receives a worm gear 29 which is internally splined at 31 for connection to a splined outer end 30 of the cam shaft 13. The body portion 25 is provided with suitable cover plates 32 to close the cavity 25 and recess 27, which plates are apertured to receive the brake operating cam shaft 13; the cover plates being secured to the body portion by suitable fastening means, such as rivets or bolts 33. Seal rings (not shown) underlie the cover plates to suitably seal the worm gear cavity.

The worm shaft bore 28 is reduced at 34 at one side of the worm recess 27 to open at the side 35 of the body portion 25 and receives the free end 47 of a worm shaft 46. The reduced portion 34 of the bore 28 terminates in an enlarged counterbore 36 at the side 35 to receive a friction member 37 formed as a resilient annular sealing element 38 engaging the free end 47 and biased thereagainst by a force member, such as a garter spring 39 or similar resilient means. An annular generally channel-shaped rigid housing 40 receives the sealing element 38 and spring 39 and is frictionally received in the counterbore 36. The friction member is similar in form to a conventional shaft seal with the sealing element 38 formed of a material having suitable friction characteristics and backed by the garter spring or an annular finger spring providing a predetermined radial force pressing the seal into contact with the shaft to exert a controlled frictional drag resisting rotation of the worm shaft for a purpose to be explained later. The end of the shaft beyond the friction member is provided with a hexagonally shaped head 41 adapted to receive a wrench for adjustment thereof.

The opposite end of the worm shaft bore 28 is counterbored at 42 and again at 43 to provide a stepped recess opening at the outer surface of the body portion 25 to receive the adjustment assembly 44. A worm 45 is mounted on the worm shaft 46 in the recess 27, the shaft being rotatably received within the bore 28. The end of the shaft opposite the free end 47 has a reduced diameter portion 48 to define a radial shoulder 49 thereon; the reduced diameter portion 48 terminating at its outer end in a reduced diameter threaded end 50 adapted to receive a washer 51 and an assembly nut 52. An actuator 53 has a cylindrical portion or hub 54 with a central passage 55 therein receiving the reduced diameter portion 48 of the worm shaft 46; the outer end of the passage being counterbored at 56 to be radially aligned with the juncture of the threaded end 50 and the reduced portion 48 to receive a seal ring 57. An annular sealing collar 58 is received in the counterbore 43 in the housing and has an outer annular groove to receive an outer seal ring 59, and an annular recess or counterbore 61 receives an inner seal ring 62.

The inner annular end face 63 of the actuator hub slidably engages the radial shoulder 49 on the worm shaft 46, and the outer end of the actuator is provided with a radial flange 64 abutting the outer face of the sealing collar 58; the washer 51 engaging the outer end surface 65 of the actuator. The actuator is provided with a laterally extending integral arm 66 adapted to be connected to an adjustment linkage 67, which linkage includes an elongated link 68 twisted in the middle through approximately 90° at 69 with the upper end 71 pivotally secured to one arm of the clevis 22 by a pivot pin 72 and the lower end 73 having an elongated slot 74 receiving a pivot pin 75 secured to the arm 66. This slot has a predetermined length to permit movement of the link to a brake apply position of the shoes without attendent movement of the actuator 53; assuming no lining wear has occurred. A one-way clutch 76 in the form of a helical spring is received in the counterbore 42 and lightly frictionally engages the outer exposed surface of the worm shaft 46 and the cylindrical portion or hub 54. The one-way clutch provides for the rotation of the worm 45 and worm shaft 46 upon rotation of the actuator 53 in one direction of rotation thereof to correct for wear in the brake lining.

In operation, assuming some lining wear has occurred, actuation of the air motor 18 causes advancement of the force transmitting rod 19 and the clevis 22 to move the slack adjuster lever arm 21 along an arc about the axis of the cam shaft 13. As the clevis must follow a substantially straight line, it pivots around the pin 23 with respect to the arm 21 and, as it does so, the elongated link 68 is moved downwardly at a lesser rate than the rate of movement of the lever arm 21. Rotation of the operating arm assembly 17 causes rotation of the cam shaft 13 and the cam 12 to move the followers 15 outwardly and urge the brake shoes 14 toward the brake drum 16 against the resistance of the brake shoe retractor springs (not shown). As rotation of the arm 21 continues and the link 68 moves downwardly, the lost motion in the slot 74 is taken up and the actuator 53 through the lateral arm 66 is rotated and spring clutch 76 is wound in such a direction that it acts to grip both the actuator hub 54 and the worm shaft 46 upon rotation of the actuator on brake application. Turning the actuator thereby causes the worm shaft 46 to advance and the worm 45 to turn with it; the worm engaging and rotating the worm gear 29 which is in turn attached to the cam shaft 13 to bring the shoes into firm contact with the drum. The worm, now under heavy load, ceases turning and further movement of arm 21 due to distortion causes the spring clutch 76 to slip as a torque limiting clutch.

As the brake is applied, the cam shaft 13 is principally advanced by the rotation of the arm 21, but as wear occurs it is secondarily advanced, relative to the arm, through the actuator 53, spring clutch 76, worm shaft 46, worm 45 and the worm gear 29. The lost motion provided in the assembly by slot 74 delays rotation of the worm shaft 46 until the arm 21 has moved a distance substantially equivalent to the desired running clearance between the brake shoes 14 and the brake drum 16. Also, the spring clutch 76 is torque limiting, in that it will rotate the worm shaft 46 only until the brake shoes 14 engage the brake drum 16, whereupon the torque required to turn the worm shaft becomes so great that the spring clutch is forced to slip in the gripping direction. As a result, no further adjustment takes place regardless of how much additional stroke occurs in the air chamber due to mechanical distortion. When the brake is released, movement of the arm 21 to the right raises the link 68 but, because the lost motion slot 74 is now below the pin 75, clockwise rotation of the actuator does not occur until the slot end contacts the pin. Thereafter, the spring clutch 76 slips with very little frictional drag causing no unintentional rotation of the worm shaft, which is restrained by the friction member 37 supplemented by internal friction of the worm shaft bearings and gear teeth.

FIGS. 4 through 6 disclose a second embodiment of the present invention with like parts having the same reference numerals with a script a. In this embodiment, the body portion 25a is provided with a worm gear cavity 26a and a worm recess 27a for the worm gear 29a and the worm 45a, respectively. Internal splines 31a are formed on the worm gear 29a to engage a splined end 30a of the cam shaft for actuating the S-shaped cam (not shown). Cover plates 32a are secured to the body portion 25a by suitable fasteners 33a to enclose the worm gear cavity 26a and worm recess 27a in the same manner as shown in FIG. 2, and a worm shaft bore 28a is provided in the body portion 25a to intersect the worm recess 27a and terminates at one end in a reduced bore 34a having a counterbore 36a to receive the friction member 37a. The opposite end of the bore 28a opens into an enlarged stepped recess 79 opening at the side of the body portion 25a in an end face 81.

The free end 47a of shaft 46a terminates in a hexagonally shaped end 41a for a purpose to be later described, and the opposite end of the shaft has a reduced diameter portion 48a, defining a radial shoulder 49a, which terminates in a reduced threaded end 50a. This embodiment does not require a sealing collar, such as that shown in FIG. 2, as the actuator 53a combines the sealing collar function therewith. The actuator 53a includes a generally annular body 83 having an axially extending cylindrical portion or hub 54a of the same external diameter as the maximum diameter of the worm shaft 46a. The actuator body terminates at its outer end in a radial flange 85 adjacent the end face 81 of the body portion 25a and has a central cylindrical passage 86 to slidably telescope over the reduced diameter portion 48a of the worm shaft 46a. The outer end of the passage 86 is counterbored at 87 to receive a seal ring 88 sealingly encompassing the threaded portion 50a of the shaft, and the outer end of the actuator body has a circular recess 89 to receive a washer 51a therein. An assembly nut 52a threadingly engages the threaded end 50a of the shaft to retain the actuator 53a in operative relationship with the worm shaft 46a. A second seal ring 91 is received in an annular groove 92 formed in the outer circumference of the actuator body 83 to sealingly engage the wall of the enlarged recess 79 adjacent the end face 81. The actuator body is also provided with an arcuate recess 93 formed in the shoulder 94 defined by the reduced cylindrical portion or hub 54a of the actuator; the recess forming spaced surfaces 95 and 96 with surface 95 acting as a stop. A limit stop member 97 is threadingly engaged in an opening in the wall of the body portion 25a and has an inner reduced end 98 projecting into the recess 79 and extending into the arcuate recess 93 to limit rotational movement of the actuator 53a in one direction only.

The inner end face 99 of the cylindrical hub 54a slidably engages the radial shoulder 49a on the worm shaft 46a, and a helical one-way spring clutch 76a lightly frictionally engages the exposed portion of the worm shaft 46a and substantially all of the cylindrical hub 54a of the actuator. A torsion spring 101 surrounds the spring clutch 76a and has one end 102 received in an opening 103 in the body portion 25a paralleling the shaft bore 28a and the opposite end 104 is received in a blind opening 105 extending into the shoulder 94 on the actuator body. The actuator 53a has a laterally extending arm 106 with an opening 107 adjacent the outer end receiving a pivot pin 75a. The elongated link 68a having a twist 69a therein has the upper end 71a secured to the clevis 22a by a pivot pin 72a and the lower end 73a has an elongated slot 74a receiving the pivot pin 75a for a purpose to be later described.

In the initial assembly, the worm gear 29a is positioned in the body portion 25a, the worm 45a is positioned in the worm recess 27a, and the worm shaft 46a is press fitted in the worm so as to rotate together. The hub 54a slidably engages the radial shoulder 49a with the assembly nut 52a adjusted to provide for a slight clearance between the hub and the shaft shoulder so that frictional engagement is held to a minimum. Also, the internal diameter of the cylindrical passage 86 is slightly larger than the diameter of the reduced portion 48a of the worm shaft 46a so that frictional engagement between the shaft 46a and hub 54a is minimized. The torsion spring 101 is assembled with its ends 102 and 104 inserted in openings 103 and 105, respectively. The actuator 53a is rotated to wind up or cock the spring 101, the stop member 97 is screwed in place and the actuator released with stop surface 95 engaging member 97, thus holding the spring in a torqued condition. The spring will be further loaded or cocked when the actuator is rotated during braking engagement. The one-way spring clutch 76a acts to overrun with little frictional drag when the brake is applied during use and will engage to drivingly rotate the worm and provide an adjustment action on the release of the brake.

With the brakes released in the vehicle, the operating arm assembly 17a is installed on the splined portion 30a of the cam shaft so that the lever arm 21a is positioned to allow a predetermined amount of slack motion or running clearance before the brake shoes will engage the brake drum. If the adjuster is assembled on the shaft with insufficient slack movement prior to brake engagement, a wrench may be engaged with the exposed hexagon portion 41a on the free end 47a of the worm shaft 46a, and the shaft is turned counterclockwise (as seen from the left-hand side of FIG. 4) to advance the arm 21a toward the piston. During this advance movement the one-way clutch 76a overruns the actuator 53a.

With new brake shoes, movement of the lever arm 21a from an at rest position to a position where the brake shoes engage the brake drum occurs without movement of the actuator 53a in view of the elongated slot 74a in the link 68a. This slot has a predetermined length upward of the pin 75a to allow movement of the link without attendant motion of the actuator 53a to a fully applied brake position. Thus, with no movement of the actuator, the worm is not rotated for adjustment of the slack in the system and unintentional rotation is prevented by the friction member 37a. As wear occurs in the brake shoes, the lever arm 21a will move to a new position beyond the normal brake application position without wear, which position requires movement of the link greater than the length of the slot 74a. As the link 68a moves downward, as seen in FIG. 6, the upper end of the elongated slot 74a engages the pivot pin 75a secured to the lateral arm 106 of the actuator 53a; and any further movement of the link downward causes rotation of the actuator in a counterclockwise direction, as viewed in FIG. 6, causing overrun by the one-way spring clutch 76a and cocking of the torsion spring 101.

Since wear has occurred on the brake shoes, there is an interval between the time the actuator just starts to turn and when the shoes contact the drum while the worm shaft is not heavily loaded. During this interval, the friction member 37a supplemented by some internal friction provides a value of friction greater than the drag of the one-way spring clutch 76a in the overrun direction plus the friction of hub 54a on the shaft 48a. Thus, unintentional adjustment is prevented.

When the brakes are engaged, the worm 45a is always under load and will not rotate even though the actuator rotates and the one-way spring clutch overruns the worm shaft. Upon release, the elongated link 58a moves upward relative to the pivot pin 75a, thus moving most of the slot 74a to the upper side of the pin 75a in the actuator arm 106. The torsion spring 101 tends to turn the actuator 53a clockwise but cannot do so because the one-way spring clutch 76a is now drivingly connected to the worm shaft 46a which is still under heavy load. Upon release of the brake shoes from the brake drum, the load on the worm 45a is reduced to a level where the torsion spring can now return the actuator 53a, thereby advancing the worm on the worm gear 29a and moving the cam shaft 31a in a slack reducing direction to a point where the predetermined running clearance between the brake shoes and the brake drum are maintained. Also, the one-way spring clutch 76a and the built-in friction prevent the worm 45a from backing off between adjustments.

Note that the slot 74a in FIGS. 4 and 6 has a portion 108 below the pin 75a to provide additional lost motion. The purpose of the additional length 108 is that with the brakes released, the actuator 53a is stopped by the member 97 and surface 95 and, if the lower end of slot 74a were to engage the pin before the brakes were fully released, this would put excess loading on pin 75a and stop 97 and might cause damage to the unit. There is no need for the link to raise the actuator arm since spring 101 performs this function. Thus, the lost motion below the pin allows for variation due to manufacturing tolerances and assembly.

I claim:

1. An automatic slack adjuster for a vehicle brake system of the type comprising a braking member and a cam shaft operatively connected thereto for rotation about its axis of rotation by said member to oscillate a cam member; said slack adjuster comprising a first gear mounted in said braking member and nonrotatably mounted on said cam shaft to form an angularly adjustable connection between said braking member and said cam shaft; a gear shaft in said braking member and carrying a second gear engaging with said first gear for angular adjustment thereof; means frictionally engaging said gear shaft; an actuator mounted on said gear shaft and rotatable relative thereto; a one-way clutch operatively connecting said actuator and said gear shaft upon rotation of the actuation in a first direction; spring means encompassing said gear shaft and acting to place a predetermined torque on said actuator; said gear shaft, second gear, friction means, actuator, one-way clutch and spring means positioned in concentric relationship; and means for rotating said actuator in a second direction in response to movement of said braking member in a brake applying direction with said spring means effective to rotate said actuator in the first direction in response to movement of said braking member in a brake releasing direction.

2. An automatic slack adjuster as set forth in claim 1, in which said actuator rotating means comprises a link connecting said actuator with a power transmitting means.

3. An automatic slack adjuster as set forth in claim 2, in which said link has a slotted opening at one end providing limited lost motion in both directions of movement of said actuator.

4. An automatic slack adjuster as set forth in claim 1, in which said spring means comprises a pretorqued spring engaging said actuator.

5. An automatic slack adjuster as set forth in claim 1, in which said friction means includes a spring-loaded seal element surrounding said gear shaft.

6. An automatic slack adjuster as set forth in claim 1, including limit stop means acting to retain the actuator in a petorqued position and limit rotation of the actuator in said first direction.

7. An automatic slack adjuster as set forth in claim 6, in which said limit stop means includes a stop member in said braking member and cooperating with a stop surface formed on said actuator.

8. An automatic slack adjuster as set forth in claim 1, wherein said actuator has a cylindrical hub telescopingly received on a reduced portion of the gear shaft, and said one-way clutch comprises a helical spring clutch encompassing and adapted to engage the actuator hub and the adjacent portion of the gear shaft.

9. An automatic slack adjuster for a vehicle brake system of the type comprising a rotatably mounted braking lever and a cam shaft operatively connected thereto for rotation about the axis of rotation of said lever to oscillate a cam member, said slack adjuster comprising a worm gear mounted in said lever and non-rotatably mounted on said shaft to form an angularly adjustable connection between said braking lever and said cam shaft, a worm shaft in said lever and carrying a worm engaging with said worm gear for angular adjustment thereof, an actuator mounted on said worm shaft and rotatable relative thereto, a one-way clutch connecting said actuator and said worm shaft and acting to drive said worm shaft upon rotation of the actuator in a first direction, spring means encompassing said worm shaft and tending to rotate said actuator in said first direction, said worm shaft, worm, actuator, one-way clutch and spring means positioned in concentric relationship, and means for rotating said actuator in a second direction in response to angular movement of said brake applying lever in the braking directions with said spring means effective to rotate said actuator in said first direction in response to movement of said braking member in a brake releasing direction.

10. An automatic slack adjuster as set forth in claim 9, in which said actuator rotating means comprises a link connecting said actuator with a power transmitting means.

11. An automatic slack adjuster as set forth in claim 10, in which said link has an elongated slot, the length of said slot providing for lost motion of the link relative to said actuator corresponding to the running clearance of the brake shoes relative to the brake drum of the vehicle brake system.

12. An automatic slack adjuster as set forth in claim 9, in which said spring means comprises a pretorqued spring engaging said actuator.

13. An automatic slack adjuster as set forth in claim 9, including friction means in said lever engaging said worm shaft.

14. An automatic slack adjuster as set forth in claim 13, in which said friction means includes a spring-loaded seal element surrounding said worm shaft.

15. An automatic slack adjuster as set forth in claim 12, including limit stop means acting to retain the actuator in a pretorqued condition.

16. An automatic slack adjuster as set forth in claim 15, wherein said limit stop means includes a stop member mounted in said lever and projecting towards said actuator, and a stop surface formed on said actuator and cooperating with said stop member to limit rotation of the actuator in said first direction.

17. An automatic slack adjuster as set forth in claim 9, wherein said actuator has a cylindrical hub and said worm shaft has a reduced diameter portion telescopingly receiving said actuator hub thereon, the external diameters of said worm shaft and said hub being substantially equal, and said one-way clutch encompassing said worm shaft and said hub.

18. An automatic slack adjuster as set forth in claim 17, wherein said one-way clutch comprises a helical spring clutch engaging said worm shaft and actuator hub, said spring clutch being wound so as to engage said shaft and hub when said actuator is rotated in said first direction.

19. An automatic slack adjuster as set forth in claim 17, wherein said spring means comprises a torsion spring encompassing said one-way clutch, one end of said spring engaging said lever and the opposite end engaging said actuator to place a predetermined torque on the actuator.

20. An automatic slack adjuster as set forth in claim 19, in which said one-way clutch comprises a helical spring engaging adjacent surfaces of said worm shaft and actuator and wound so as to grip said surfaces on rotation of said actuator in said first direction.

21. An automatic slack adjuster as set forth in claim 9, wherein said lever is connected to a power transmitting means so as to be operable thereby for rotation of the lever about its axis of rotation, and linkage means interconnecting said brake operating means with said actuator.

22. An automatic slack adjuster as set forth in claim 21, in which said linkage means comprises an elongated link, said actuator having a laterally extending arm, said link being pivotally connected at one end to said actuator arm and at the opposite end to said power transmitting means.

23. An automatic slack adjuster as set forth in claim 22, wherein said actuator arm has a pivot pin adjacent the outer end thereof, and said link has an elongated slot adjacent said opposite end receiving said pivot pin.

24. An automatic slack adjuster as set forth in claim 23, in which said elongated slot provides limited lost motion in both directions of movement of said link.

25. An automatic slack adjuster as set forth in claim 9, including a limit stop member mounted in said lever and projecting towards said actuator, said actuator having an arcuate recess formed therein and defining a stop surface cooperating with said stop member to limit the extent of rotation of said actuator in said first direction, said worm shaft having a reduced diameter portion, said actuator having a cylindrical hub telescoping over the reduced diameter portion of the worm shaft, the external diameters of the worm shaft and the hub being substantially equal, said one-way clutch comprising a helical spring engaging the adjacent external surfaces of the worm shaft and actuator hub and wound so as to grip said surfaces upon rotation of said actuator in said first direction, said spring means comprising a torsion spring encompassing said one-way clutch with the opposite spring ends anchored in said lever and said actuator so as to place a predetermined torque on the actuator, said actuator having a laterally extending arm, power transmitting means connected to said lever, and an elongated link pivotally connected at one end to said power transmitting means and pivotally connected at the opposite end to said actuating arm, said link having an elongated slot adjacent said opposite end and receiving a pivot pin forming the pivotal connection with said actuating arm to provide a predetermined lost motion corresponding to the normal running clearance between the brake shoes and the brake drum of the vehicle brake system.

* * * * *